3,402,159
PROCESS FOR POLYMERIZING BUTADIENE AND STYRENE TERMINATED IN SHORT BLOCKS OF POLYSTYRENE
Henry L. Hsieh, Bartlesville, Okla., assignor to Phillips Petroleum Company, a corporation of Delaware
No Drawing. Filed Dec. 20, 1963, Ser. No. 332,251
1 Claim. (Cl. 260—85.1)

This invention relates to a process for the production of copolymers of conjugated dienes with vinyl-substituted aromatic compounds. In another aspect, this invention relates to the production of copolymers of conjugated dienes with vinyl-substituted aromatic compounds and having reduced tendency to cold flow.

It is known that random copolymers of conjugated dienes with vinyl-substituted armoatic compounds can be produced in the presence of organolithium initiators when a polar compound is also present in the polymerization system. When relatively high concentrations of the conjugated dienes are employed, and particularly when the conjugated diene is employed in amounts of 60 parts by weight or more per 100 parts by weight of total monomers, the products are elastomeric and have a tendency to undergo cold flow.

Accordingly, an object of my invention is to provide an improved process for the preparation of copolymers of conjugated dienes and vinyl-substituted aromatic compounds. Another object of my invention is to provide an improved copolymer of a conjugated diene and a vinyl-substituted aromatic compound prepared in the presence of an organolithium initiator and having a reduced tendency to cold flow.

Other objects, advantages and features of my invention will be readily apparent to those skilled in the art from the following discussion and the appended claim.

I have discovered that if the elastomeric rubbery copolymers as hereinbefore described are prepared under conditions which cause the addition of a short terminal block of polymerized vinyl-substituted aromatic compound to the polymer chain, the cold flow is drastically reduced.

Conjugated dienes employed in my invention are those containing from 4 to 12 carbon atoms per molecule. Examples of these monomers include 1,3-butadiene, isoprene, piperylene, 2,3-dimethyl-1,3-butadiene, 1,3-octadiene, 4,5 - diethyl - 1,3 - octadiene, and the like. Suitable vinyl-substituted aromatic compounds include styrene, 2-methylstyrene, 1-vinylnaphthalene, and the like. Copolymers of particular interest are those prepared from butadiene and styrene.

The organolithium initiators employed in the polymerization system of my invention can be represented by the formula $RLi_x$ wherein R ise a hydrocarbon radical selected from the group consisting of aliphatic, cycloaliphatic and aromatic radicals containing from 1 to 20 carbon atoms and x is an integer of from 1 to 4. Examples of such initiators include methyllithium, n-butyllithium, phenyllithium, cyclohexyllithium, 1,4-dilithiobutane, 1,4 - dilithio - 2 - methyl - 2 - butene, dilithionaphthalene, 1,2 - dilithio - 1,2 - diphenylethane, tetralithionaphthalene, and the like. The organo monolithium compounds are preferred.

The polar compound employed in the polymerization system of my invention causes the production of a random copolymer. In the absence of the polar compound, a block copolymer is produced. The polar compound must be of a type that does not inactivate the organolithium initiator. Ethers, thioethers (sulfides), and tertiary amines are types of polar compounds that will not inactivate the initiator and are suitable for the polymerization system. Examples of suitable polar materials include dimethyl ether, diethyl ether, methyl ethyl ether, ethyl n-propyl ether, di-n-propyl ether, di-n-octyl ether, dibenzyl ether diphenyl ethers, tetramethylene oxide (tetrahydrofuran), 1,2-dimethoxyethane, dioxane, paraldehyde, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylaniline, and N-methyl-N-ethylaniline. Mixture of these polar compounds can also be employed.

The polymerization reaction is conducted in the presence of a hydrocarbon diluent selected from the group consisting of aromatic hydrocarbons, paraffins and cycloparaffins. Examples of suitable hydrocarbon diluents include propane, isobutane, n-pentane, isooctane, n-dodecane, cyclopentane, dimethylcyclopentane, cyclohexane, methylcyclopentane, ethylcyclopentane, ethylcyclohexane, benzene, toluene, xylene, ethylbenzene, and the like. Mixtures of these various materials can also be employed.

A preferred method for preparing the copolymers of my invention having a low cold flow is to charge the conjugated diene, vinyl-substituted aromatic compound, hydrocarbon diluent, polar compound, and organolithium initiator to a reactor and conduct the polymerization in an inert atmosphere such as nitrogen until substantially complete conversion of the monomers is obtained. A second quantity of vinyl-substituted aromatic compound, preferably in the range of 0.5 to 4 weight percent, based on the product copolymer, is then introduced into the reactor and polymerization continued in a second polymerization step.

The two monomers are introduced into the polymerization reaction zone in a ratio so as to produce an elastomeric random copolymer in the first polymerization step. As previously noted, the invention is particularly applicable when the conjugated diene is employed in amounts of 60 parts by weight or more per 100 parts by weight of total monomers.

The quantity of the organolithium initiator employed in the polymerization process can vary over a rather wide range. In general, the amount should be at least 0.02 part by weight per 100 parts by weight of the monomers to be polymerized. The upper limit for the amount of the organolithium initiator to be employed depends largely upon the desired inherent viscosity of the copolymer obtained in the polymerization. The inherent viscosity of the polymer product decreases with increasing amounts of the organolithium initiator. A preferred initiator or catalyst level is from 0.1 to 2.0 parts by weight of the organolithium per 100 parts by weight of the total monomers charged to the polymerization zone.

Polar compounds vary in their efficiency to produce completely random copolymers. When operating in the manner hereinbefore described, a sufficient amount of polar compound is charged so that the total quantities of both types of monomers undergo random copolymerization. The amount of polar compound generally employed falls in the range of 0.005 to 50 weight percent of the total hydrocarbon diluent and polar compound mixture. In the case of dialkyl ethers, it is preferred that the mixture contain at least 1 percent by weight, more desirably at least 3 percent by weight, of these polar compounds. With certain of the more active polar compounds, lesser amounts can be utilized. For example, heterocyclic ethers, such as tetrahydrofuran, can be employed in amounts ranging from 0.1 to 50 weight percent while diethers, such as 1,2-dimethoxyethane, can be used in amounts ranging from 0.005 to 50 weight percent of the total mixture.

The polymerization process of this invention can be carried out at any temperature within the range of about −80° to 150° C., but it is preferred to operate in the range of −20 to 80° C. The polymerization reaction can be carried out under autogenous pressures. It is usually desirable to operate at a pressure sufficient to maintain the monomeric materials substantially in the liquid phase. The pressure will thus depend upon the particular materials being polymerized, the hydrocarbon diluent-polar compound mixture being employed, and the temperature at which the polymerization is carried out. However, higher pressures can be employed, if desired, these pressures being obtained by some such suitable method as the pressurization of the reactor with a gas which is inert with respect to the polymerization reaction.

Various materials are known to be destructive to the organolithium initiator of this invention. These materials include carbon dioxide, oxygen, water, alcohols, mercaptans, and primary and secondary amines. It is highly desirable, therefore, that the monomers be substantially free of these materials, as well as other materials which tend to inactivate the catalyst. Any of the known means for removing such contaminants can be employed. Also, it is preferred that the hydrocarbon diluent-polar compound mixture employed in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely deactivate the catalyst.

After conversion of the monomers in the first polymerization step to produce a random copolymer is complete, an amount of vinyl-substituted aromatic compound sufficient to produce a short terminal block and preferably an amount in the range of 0.5 to 4 weight percent, based on the product copolymer, is introduced into the polymerization zone and polymerization continued in a second polymerization step. The length of the vinyl-substituted aromatic compound homopolymer block is regulated by controlling the amount of the vinyl-substituted aromatic compound charged in the second polymerization step of the process. The vinyl-substituted aromatic compound employed in the second polymerization step can be the same or different from the vinyl-substituted aromatic compound employed in the first polymerization step.

At the completion of the polymerization reaction in the second polymerization step, the reaction mixture is treated to inactivate the catalyst and recover the polymer product. While it is to be understood that any suitable treating method can be employed, one method for accomplishing the desired treatment comprises adding to the reaction mixture a catalyst-inactivating material such as water, an alcohol, e.g., ethyl alcohol or isopropyl alcohol, an organic or inorganic acid, or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution.

After addition of the catalyst deactivating agent and the antioxidant, the polymer present in the solution can then be precipitated by the addition of an excess of a material such as ethyl alcohol or isopropyl alcohol. It is to be understood that deactivation of the catalyst and precipitation of the polymer can be accomplished in a single step. The precipitated polymer can then be recovered by filtration, decantation or the like. It is also within the scope of this invention to employ other means to recover the polymer from solution, if desired.

In order to further purify the polymer, the separated polymer can be redissolved in a suitable solvent and then precipitated by the addition of an alcohol. Thereafter, the polymer is again recovered by suitable separation means such as indicated hereinbefore, and dried. Any suitable hydrocarbon solvent can be employed in this purification step to redissolve the polymer.

Copolymers produced in accordance with this invention comprise random copolymer chains terminated with short blocks of the polymerized vinyl-substituted aromatic compound. If a monolithium compound is employed in the polymerization step, the polymer chain will have a block at one end; if a dilithio compound is employed in the polymerization step, the polymer chain will have a block on each end. Preferably, although not to be limited thereto, the quantity of polymerized vinyl-substituted aromatic compound present is the form of one or more homopolymer blocks should not exceed 4 weight percent, based on the product copolymer.

The rubbery copolymers produced in accordance with this invention have utility in applications where synthetic and natural rubbers are employed. The rubbery copolymers can be compounded by any of the known methods as have been used in the past for compounding rubbers. Compounding ingredients, such as fillers, dyes, pigments, curing or cross-linking agents, softeners, reinforcing agents and the like can be used in the compounding operation. In manufacturing finished articles, the rubbery random copolymers can be molded or extruded. They can be advantageously employed in the manufacture of items such as automobile tires, gaskets, containers, pipe and the like.

The following example is presented as illustrating the effectiveness of the invention. It is not intended that the invention should be limited to the specific embodiments illustrated therein.

Example

A butadiene/styrene random copolymer was prepared in the presence of butyllithium as the initiator. The following recipe was used:

| | |
|---|---|
| 1,3-butadiene, parts by weight | 75 |
| Styrene, parts by weight | 25 |
| Cyclohexane, parts by weight | 780 |
| Tetrahydrofuran, parts by weight | 2 |
| n-Butyllithium, millimoles | 1.4 |
| Temperature, ° F. | 122 |
| Time, hours | 1.5 |

After a polymerization period of 1.5 hours, 4 parts by weight of styrene was added and the polymerization reaction was continued at 122° F. for 0.5 hour. A control run (Run 2) was carried out in which no additional styrene was introduced. Both reactions were shortstopped with a 50/50 volume mixture of isopropyl alcohol and toluene containing about 1 part by weight per 100 parts by weight rubber of the antioxidant 2,2-methylene-bis(4-methyl-6-tert-butylphenyl). The polymers were then coagulated in isopropyl alcohol, separated and dried. The results are summarized as follows:

| Run No. | Polystyrene Wt. Percent [1] | Inherent Viscosity [2] | Cold Flow, Mg./Min.[3] |
|---|---|---|---|
| 1 | 3.9 | 1.10 | 3.2 |
| 2 | 0 | 1.13 | 16.5 |

[1] The quantity of styrene present as polystyrene was determined by an oxidative degradation process. Approximately 0.5 gram of the polymer was cut into small pieces, weighed to within 1 milligram, and charged to a 125 ml. flask. Forty to fifty grams of p-dichlorobenzene were then charged to the flask and the contents were heated to 130° C. The mixture was cooled to 80 to 90° C.; 8.4 ml. of a 71.3 percent by weight aqueous solution of tert-butyl hydroperoxide was added followed by 1 milliliter of 0.003 molar osmium tetroxide and toluene. The mixture was then heated to between 110 and 115° C. for 10 minutes, then cooled to between 50 and 60° C., 10 milliliters of toluene added, and the solution poured slowly into 250 milliliters of ethanol containing a few drops of concentrated sulfuric acid. This treatment causes any polystyrene present to coagulate, after which it can be recovered, dried and weighed.

[2] One-tenth gram of polymer was placed in a wire cage made from 80 mesh screen and the cage was placed in 100 ml. of toluene contained in a wide-mouth 4-ounce bottle. After standing at room temperature (approximately 77° F.) for 24 hours, the cage was removed and the solution was filtered through a sulfur adsorption tube of Grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

[3] Cold flow was measured by extruding the polymer through a ¼-inch orifice at 3.5 p.s.i. pressure and a temperature of 50° C. After allowing 10 minutes to reach steady state, the rate of extrusion was measured and the values reported in milligrams per minute.

The above data clearly show that the introduction of a short polystyrene block in the end of the polymer chain provided a very effective means of reducing cold flow in the butadiene/styrene copolymer.

Various modifications of this invention can be made, or followed, in view of the foregoing disclosure, without departing from the spirit or scope thereof.

I claim:

1. A process which comprises: introducing into a polymerization zone 1,3-butadiene and styrene, the quantity of said 1,3-butadiene being at least 60 parts by weight per 100 parts by weight total monomers, said polymerization zone containing tetrahydrofuran, cyclohexane, and n-butyllithium initiator; conducting the polymerization in an inert atmosphere under conditions to give a polymer of substantially the final viscosity desired until substantially complete conversion of the monomers is obtained; thereafter introducing into said polymerization zone a second quantity of styrene in an amount within the range of 0.5 to 4 weight percent based on the weight of the total polymer; and recovering from said polymerization zone a copolymer wherein random copolymer chains are terminated in short blocks of polystyrene.

References Cited

UNITED STATES PATENTS

| 2,975,160 | 3/1961 | Zelinski | 260—880 |
| 3,280,084 | 10/1966 | Zelinski et al. | 260—880 |
| 3,287,333 | 11/1966 | Zelinski | 260—880 |
| 3,251,905 | 5/1966 | Zelinski | 260—879 |

JOSEPH L. SCHOFER, *Primary Examiner.*

W. F. HAMROCK, *Assistant Examiner.*